(No Model.)

W. I. TAYLOR.
CAMERA OBSCURA.

No. 243,813. Patented July 5, 1881.

Witnesses:
W. B. Masson
C. C. Shepherd.

Inventor:
W. Irving Taylor
by E. E. Masson
atty.

UNITED STATES PATENT OFFICE.

W. IRVING TAYLOR, OF NORFOLK, VIRGINIA.

CAMERA OBSCURA.

SPECIFICATION forming part of Letters Patent No. 243,813, dated July 5, 1881.

Application filed April 29, 1881. (No model.)

*To all whom it may concern:*

Be it known that I, W. IRVING TAYLOR, a citizen of the United States, residing at Norfolk, in the county of Norfolk and State of Virginia, have invented certain new and useful Improvements in Cameras Obscura, of which the following is a specification.

My invention relates to improvements in cameras obscura used by painters for outlining and enlarging pictures; and the objects of my improvements are to provide at a small expense an effective apparatus having a single lens of large diameter supported in a shutter hinged at the bottom to a quadrangular frame and provided with an adjustable reflector, by which means the operator can fasten a small picture in position on the apparatus without leaving the darkened chamber, and reproduce it enlarged to any required size for painting on a canvas behind the camera by the aid of natural or artificial light.

Heretofore cameras have been made with a sliding lens-tube provided with a series of concavo-convex and single convex lenses, a stationary reflector, and an adjustable table; but they are much more costly than my apparatus, and are not capable of the same adjustment.

My invention will first be described in connection with the drawings, and then pointed out in the claims.

Figure 1:
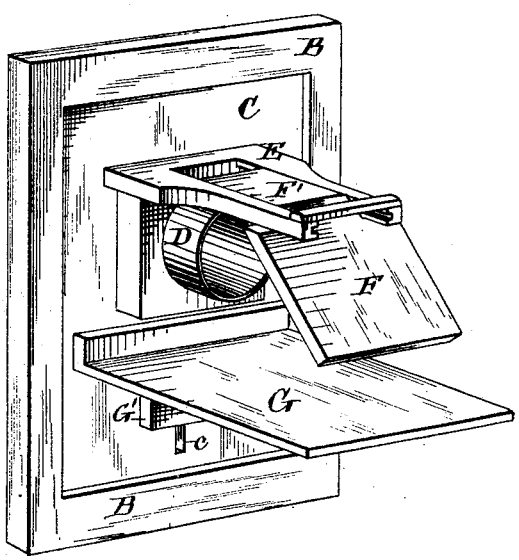
Figure 2:
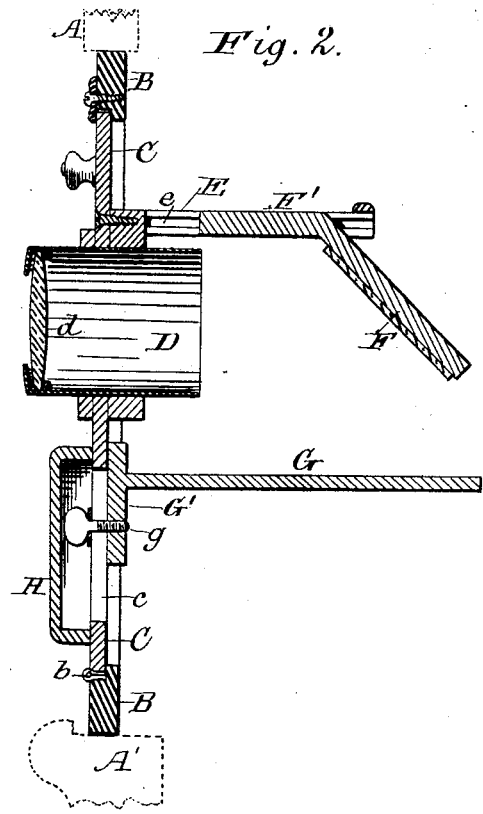
Figure 3:
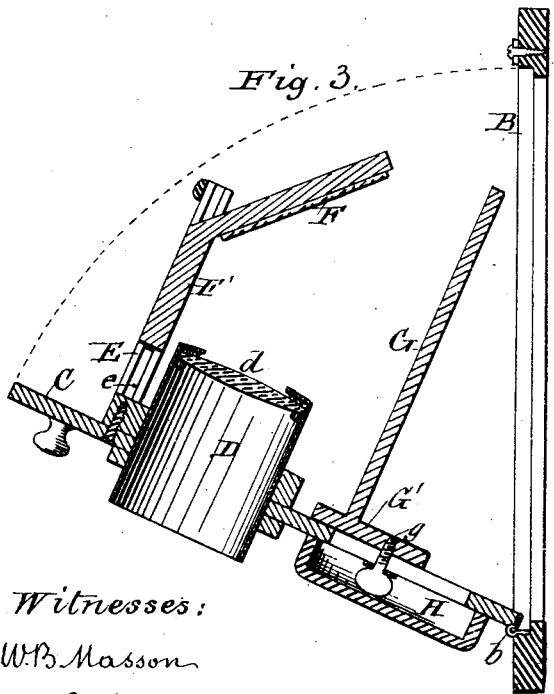
Figure 4:
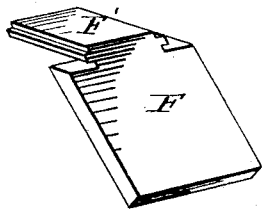

In the drawings, Figure 1 represents a perspective view of the apparatus. Fig. 2 represents a vertical section of the same with the frame closed by the lens-carrying shutter thereof. Fig. 3 represents a vertical section of the apparatus with the shutter turned partly down, as when a small picture is to be secured upon or removed from its table. Fig. 4 represents a perspective view of the adjustable reflector.

In said drawings, A and A' represent the top and bottom of a window-opening; B, a quadrangular frame made to fill the window-opening. The inner edge of this frame is rabbeted to receive a shutter, C, hinged thereto at $b$, and through the upper part of this shutter is passed the lens-tube D, carrying a single lens, $d$. Above this lens-tube is secured to the front part of the shutter a frame, E, having grooves $e$ in the inner edges thereof to receive the edges of the frame F' of a reflector, F, set at an angle of forty-five degrees with the axis of the lens-tube. This reflector can by this construction be adjusted with relation to its distance from the lens $d$ and with relation to the center of a photograph or other picture that may be placed upon the table G. This table is parallel with the axis of the lens-tube, and is retained at any desired height or distance from said tube by means of a thumb-screw, $g$, passing through a vertical slot, $c$, in the shutter, and entering the back part, G', of said table. The slot $c$ is covered and the head of the thumb-screw $g$ is inclosed by the box-cover H, hinged to the inner side of the shutter C.

In using this device the operator is not obliged to pass alternately from the glaring sunlight to the darkened chamber in adjusting or placing a picture upon the table G; but by giving a quarter-revolution to the turn-button $i$, or other fastening securing the upper part of the shutter to the quadrangular frame B, said shutter will be turned down as shown in Fig. 3. The picture is then secured from within the dark chamber upon the table G with tacks or elastic bands, and the reflector F adjusted according to the location of the picture upon said table. Then the shutter is returned and secured in the position shown in Figs. 1 and 2, and the height of the table adjusted from the inside, as well as the position of the lens $d$ with regard to the reflector.

The lens-tube is provided with a single lens of relatively large diameter, and gives as good results as the series of small lenses heretofore used, and costs much less. Said tube is cylindrical, so that it can be turned end for end in the opening made for that purpose in the shutter C, and thus the focus of the lens can be varied with relation to the size of the picture it is intended to copy or to the size of the copy to be obtained. The said copy is generally made upon a painter's canvas, a sheet of drawing-paper, or a white screen placed in the darkened room so that its plane shall be perpendicular to the axis of the lens-tube. An outline of the drawing can then be drawn by tracing the lines thereof as they appear on the white screen or paper.

The device can easily be taken apart and reduced to a compact form by simply removing the two screws uniting the table G and reflector-frame E to the shutter C.

Having now fully described my invention, I claim—

1. The combination of an adjustable table, an adjustable sliding reflector, and an adjustable and reversible tube carrying a single lens, substantially as and for the purpose described.

2. The combination of a quadrangular frame, a shutter hinged thereto, an adjustable table, an adjustable reflector, and an adjustable and reversible lens-tube and lens, substantially as and for the purpose described.

3. The combination of a quadrangular frame, a shutter hinged to the lower part thereof, an adjustable table, a frame, E, provided with grooves, an adjustable reflector adapted to slide in said grooves, and an adjustable and reversible lens-tube, substantially as and for the purposes set forth.

W. IRVING TAYLOR.

Witnesses:
E. E. MASSON,
W. B. MASSON.